United States Patent [19]

Gale

[11] 3,768,612

[45] Oct. 30, 1973

[54] SELF-ADJUSTING CLUTCH RELEASE MECHANISM

[75] Inventor: Ronald John Gale, Kineton, Green Glades, Hornchurch, England

[73] Assignee: Ford Motor Company, Dearborn, Mich.

[22] Filed: Dec. 7, 1970

[21] Appl. No.: 95,646

[30] Foreign Application Priority Data

Jan. 13, 1970 Great Britain .................... 1,504/70

[52] U.S. Cl. ......... 192/111 A, 188/196 P, 192/99 S

[51] Int. Cl. ........................................... F16d 13/60

[58] Field of Search ....................... 192/99 S, 111 A; 188/67, 196 P

[56] References Cited

UNITED STATES PATENTS

| | | | |
|---|---|---|---|
| 3,286,803 | 10/1966 | Zeidler | 192/111 A |
| 3,394,787 | 7/1968 | Fitzgerald | 192/111 A |
| 3,430,745 | 3/1969 | Randol | 192/111 A |
| 3,589,479 | 5/1971 | Plaat et al. | 188/196 P |

*Primary Examiner*—Benjamin W. Wyche
*Assistant Examiner*—Randall Heald
*Attorney*—John R. Faulkner and Clifford L. Sadler

[57] ABSTRACT

A self-adjusting clutch release mechanism having a clutch release cable and a clutch pedal. The pedal carries a locking plate and a guiding plate that slidably engage the end of the cable. When the clutch pedal is in its position corresponding to clutch engagement, the plates are disengaged from the cable and a coil spring removes any slack in the cable system. When the clutch pedal is moved toward its clutch released position, the plates grip the cable to release the clutch.

3 Claims, 3 Drawing Figures

10
11
13
14
15
16
17
18
19
20
21
23
24
25
26
27
29
30
31
32

22
26
27
28
34
35
X
Y 31
32
29
26
30
27
19
24
16
21
25
15
13
11
10

SELF-ADJUSTING CLUTCH RELEASE MECHANISM

BACKGROUND OF THE INVENTION

This invention relates to a self-adjusting clutch release mechanism suitable for use with a motor vehicle clutch of the diaphragm spring type.

In a widely used form of clutch release mechanism, a clutch pedal is connected to the release lever of a clutch by a cable. The cable is held in tension by a spring acting on the clutch pedal so that the clutch release bearing is held in constant engagement with a diaphragm spring within the clutch assembly. British patent specification No. 1,081,798 shows a mechanism of this kind which is manually adjustable by a screw.

This invention teaches an improvement in motor vehicle clutches wherein a novel self-adjusting clutch release mechanism is provided.

BRIEF SUMMARY OF THE INVENTION

According to the presently preferred embodiment of this invention, a self-adjusting clutch release mechanism has the following features. A rod is operatively connected to a clutch release bearing. The rod extends through an aperture in a locking plate loosely carried by a clutch pedal. When the clutch pedal is depressed, a force is aplied to the locking plate causing it to cant whereby the edges of the aperture grip the rod and the clutch is released as the pedal moves. When the clutch pedal is returned to its at-rest position, the locking plate engages a stop which realigns its aperture with the rod so that the rod can move freely through the aperture.

A spring acts upon the rod to take up any slack in the cable between the rod and the clutch release bearing when the locking plate engages the stop and the rod is freely movable through the aperture. Such slack might be caused by wear of the friction faces on the clutch disc.

BRIEF DESCRIPTION OF THE DRAWINGS

The invention will now be more particularly described with reference to the accompanying drawings, in which.

DETAILED DESCRIPTION OF THE PREFERRED EMBODIMENT

Figure 1:
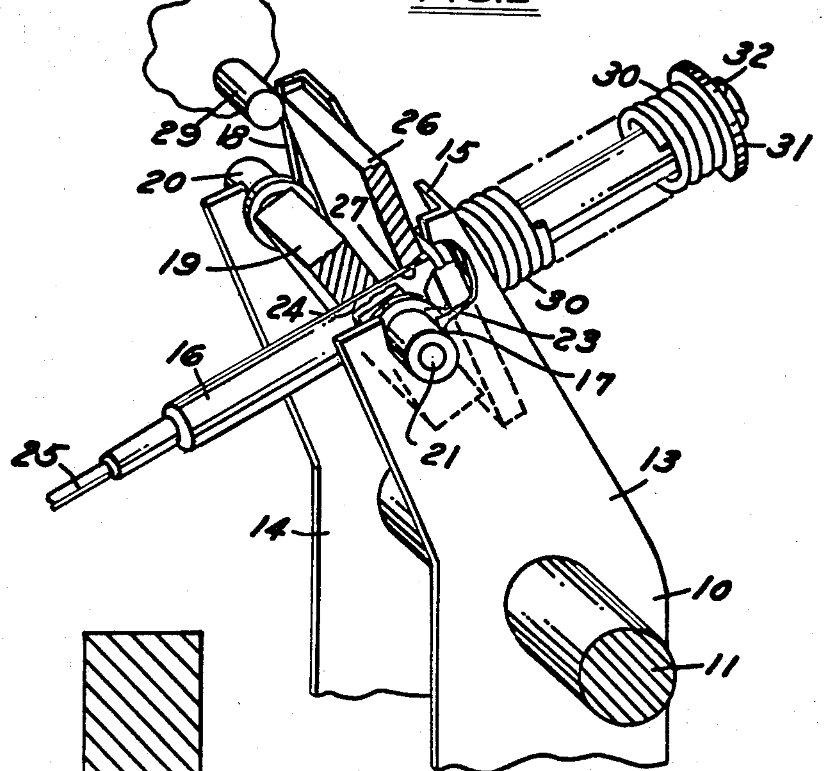
FIG. 1 is a perspective view of the upper end of the clutch pedal in a clutch release mechanism embodying the invention, partly cut away to show the locking plate.
Figure 3:
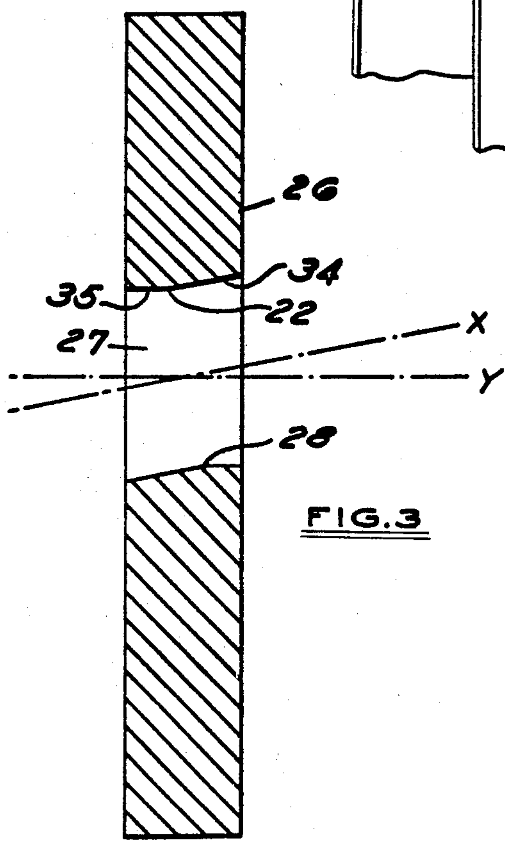
FIG. 3 is an enlarged elevational view in section of the locking plate.

FIG. 1 discloses a perspective view of a portion of a clutch release system having an automatic adjusting means. A clutch pedal 10 is pivotally mounted in a motor vehicle by a shaft 11. A pedal pad (not shown) is fixed to the lower end of the pedal lever 10. The pedal 10 is a stamping of channel section that includes side flanges 13 and 14 extending forwardly from a web 15. The top of the web 15 is cut away to accommodate a rod 16 fitted to the end of a clutch actuator cable 25 as will be described below. The upper end of the side flanges 13 and 14 are formed with generally vertically extending slots 17 and 18, respectively.

A guide plate 19 is fixed to pivot pins 20 and 21 which ride in the slots 17 and 18, respectively. The guide plate 19, therefore, is pivotally supported with respect to the upper end of the pedal 10. Flanges 22 and 23 are formed on the inboard ends of pins 20 and 21 to locate the guide plate 19 transversely with respect to the side flanges 13 and 14 of the pedal 10.

Figure 2:
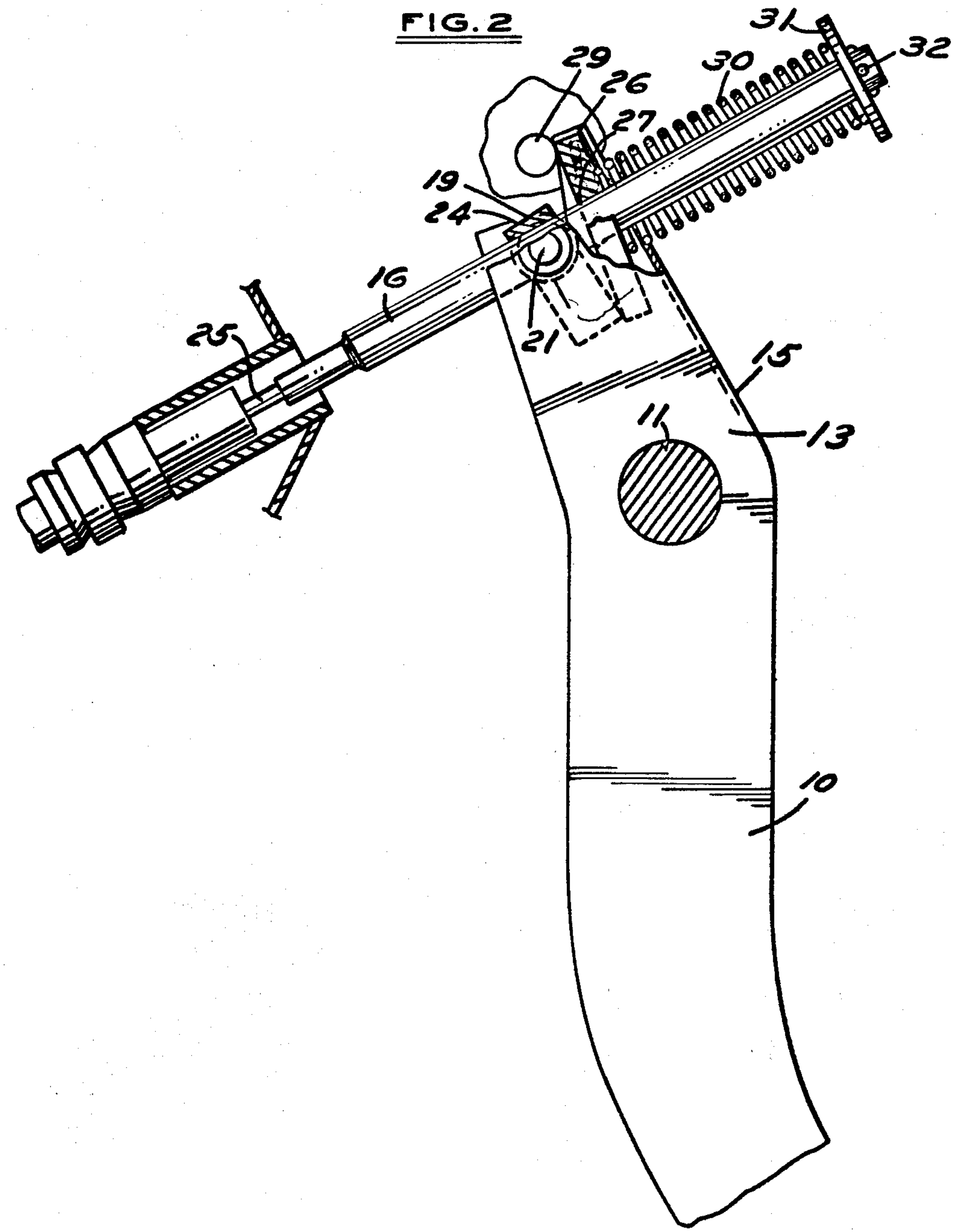
FIG. 2 is a side elevational view of the mechanism shown in FIG. 1.

The rod 16 has a close sliding fit within a bore 24 formed in the guide plate 19. As seen in FIG. 2, the axis of the bore 24 passes through the plate 19 at a slight angle to its end face and intersects the pivot axis of the pins 20 and 21. The forward end of the rod 16 is connected to one end of a Boweden cable 25. The other end of the cable 25 is connected to the release lever of a motor vehicle clutch assembly. The clutch may have a diaphragm spring urging the clutch plate into engagement with the clutch disc.

A locking plate 26 fits between the side flanges 13 and 14 of pedal 10 and between the guide plate 19 and the web 15. The locking plate 26 has an aperture 27 formed by drilling a first bore 34 along an axis X and a second bore 35 along an axis Y which is at an angle of about 12° with respect to axis X. Axis Y is arranged generally perpendicular to the sides of the locking plate 26. The aperture 27, therefore, includes an inner sharp edge restricted portion 28 from which the walls of the aperture diverge. The rod 16 extends through the aperture 27 and has a diameter that is less than the diameter of the first bore 34 of axis X but greater than the diameter of the second bore 35 of axis Y.

A stop member 29 is fixed to vehicle body structure. When the pedal 10 is released to its extreme counterclockwise position as shown in FIG. 2, both the locking plate 26 and the top of the pedal 10 engage the stop 29. The stop 29 contacts the edge of the slots 17 and 18 in flange 14.

A compression coil spring 30 is fitted over the rear end of the rod 16 and acts between the locking plate 26 and a washer 31 retained on the rod by a split or cotter pin 32.

OPERATION

FIG. 2 illustrates the clutch release pedal system in an "at-rest" condition with the clutch engaged. The rod 16 is in sliding engagement with the hole 24 in the guide plate 19. The rod 16 is also in sliding engagement with the larger diameter bore portion 34 of aperture 27 in locking plate 26. The spring 30 exerts a force tending to pull rod 16 and cable 25 to the right (as seen in FIG. 2). This force removes slack from the cable system when the rod 16 is in sliding engagement with the plates 19 and 26.

When the pedal 10 is depressed causing it to rotate about pin 11 in a clockwise direction, the guide plate 19 exerts a force on the lower part of the locking plate 26 tending to rotate the locking plate relative to the rod 16 in a direction bringing axis Y of the locking plate aperture 27 into alignment with the rod 16. This force causes the edges 28 to grip the rod 16 firmly so that the locking plate 26 will pull the rod rearwardly upon further movement of the pedal 10 thereby disengaging the clutch.

When the clutch is re-engaged by allowing the pedal 10 to return to its full counterclockwise position, the locking plate 26 remains in locking engagement with the rod 16 until the plate 26 contacts the stop 29. The coil spring 30 then angularly displaces the locking plate about the stop 29 in a direction to align the rod 16 with the axis X of plate 26, thereby releasing the locking plate 26 from gripping engagement with the rod 16. As the locking plate 26 is displaced by the spring 30, full return movement of the pedal 10 causes the side flanges 13 and 14 to contact the stop 29. The rod 16 is now free to slide through the guide plate 19 and locking plate 26 under the force of spring 30. If the clutch is correctly adjusted, there will be negligible movement of the rod 16 relative to the plate 19, but if the clutch has become maladjusted, for example through wear of the friction facings on the clutch disc, the rod 16 will move to the right through the guide plate 19 until tension in the cable 25 is balanced by the compression in the spring 30.

The spring 30 is selected to produce a desired preload of the clutch release bearing against the diaphragm spring of the clutch assembly.

SUMMARY

A clutch release pedal system in accordance with this invention provides a simple, but effective means for automatically adjusting the position of the clutch release bearing by removing slack in the clutch actuator cable. The preferred embodiment includes a gripping means interposed between the clutch pedal and clutch release mechanism that is constructed to grip the release mechanism when the pedal is moved from a clutch engaged position to a clutch released position and a spring for removing slack from the clutch release mechanism when the gripping means is released.

The foregoing description presents the presently preferred embodiment of this invention. Modifications and alterations may occur to those skilled in the art that will come within the scope and spirit of the following claims.

I claim:

1. A clutch release mechanism comprising a pivotally mounted clutch pedal movable between a clutch released position and a clutch engaged position, a rod constructed to be connected to a clutch release bearing, gripping means interposed between said rod and said pedal, said gripping means comprising a guide plate slidably engaging said rod and a locking plate engaging said rod, spring means connected to said rod and constructed to urge it in a clutch release direction, said locking plate being tiltable between a first position in which it slidably engages said rod and a second position in which it grips said rod, stop means constructed to move said locking plate to said first position when said clutch pedal is in its clutch engaged position, said guide plate being constructed to move said locking plate to said second position when said clutch pedal is moved to its clutch released position.

2. A clutch release mechanism according to claim 1 and including:

said spring means being interposed between said rod and said locking plate and constructed to urge said locking plate to its said first position.

3. A vehicle control mechanism comprising a pivotally mounted lever movable between first and second positions, an actuator having an elongated portion, gripping means interposed between said lever and said actuator, said gripping means being constructed to provide a force transmitting connection between said lever and said actuator when said lever is in said second position, said gripping means being further constructed to permit relative displacement between said lever and said actuator when said lever is in said first position, said gripping means comprising a member having an aperture therethrough, said actuator portion extending through said aperture, said member being tiltable between a first position in which said actuator is slidable in said aperture and a second position in which said member grips said actuator, means constructed to move said member to said first position in response to displacement of said lever to said first position, means constructed to move said member to said second position in response to displacement of said lever to said second position.

* * * * *